March 25, 1941.   G. H. TREVOR   2,236,022
ROPE SOCKET
Filed July 10, 1939
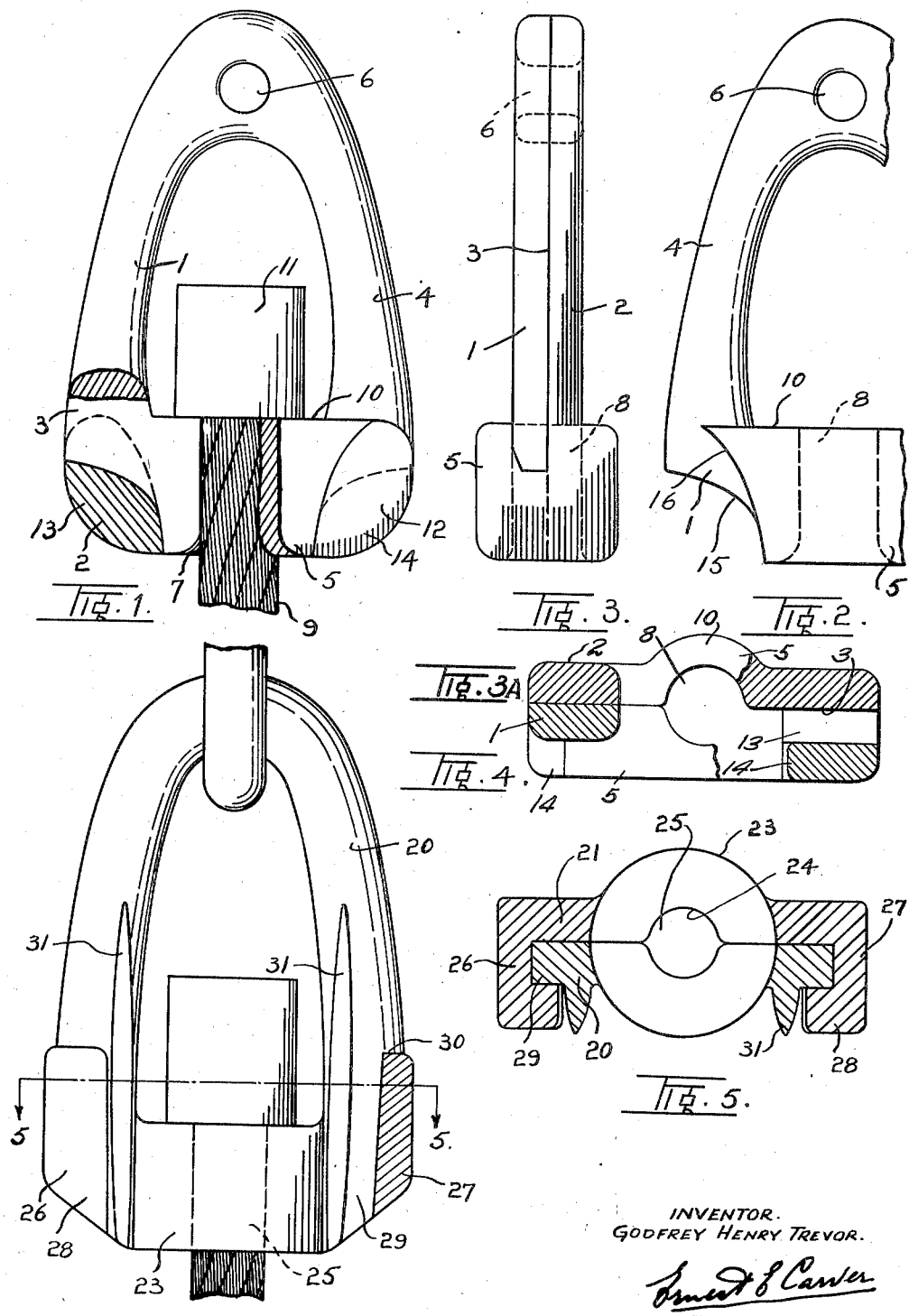
INVENTOR.
GODFREY HENRY TREVOR.
ATTORNEY.

Patented Mar. 25, 1941

2,236,022

UNITED STATES PATENT OFFICE 2,236,022

ROPE SOCKET

Godfrey Henry Trevor, Vancouver,
British Columbia, Canada

Application July 10, 1939, Serial No. 283,533

4 Claims. (Cl. 294—78)

My invention relates to improvements in rope sockets which are particularly adapted for use in the logging industry, such for instance as in connecting a choker or tag line to a hauling rope.

The objects of the invention are to provide a socket which is free from springs or other parts liable to be put out of order by frost, snow or dirt, and to provide a structure which can be divided without effort when desired to disconnect the choker line therefrom. A still further object is to provide a hook which can be trailed along the ground or in brush which will not foul or become disconnected or separated.

The invention consists essentially of a socket formed with two half portions having mated portions adapted when in normal position to hold them together, said half portions being adapted for sliding movement relative to each other to separate them, as will be more fully described in the following specification and shown in the accompanying drawing, in which:

Fig. 1 is a front elevational view of the invention partly broken away.

Fig. 2 is a side elevational view of the invention.

Fig. 3 is a fractional front elevation of one half of the socket.

Fig. 3A is a plan view with a portion cut away to show the hook members.

Fig. 4 is a front elevational view of a modification partly broken away.

Fig. 5 is a plan view of the modification taken on the line 5—5 of Figure 4.

In the drawing like characters of reference indicate corresponding parts in each figure.

The numeral 1 indicates the front half and 2 the rear half of the socket. The front and rear halves 1 and 2 are provided with plane meeting faces 3, each consisting of a loop 4 having a transverse base 5. The upper end of the loop 4 is provided with an eye 6 through which a clevis pin, not shown, is adapted to extend. The base 5 of each loop is recessed from its inner face 3 as at 7 to form, when said halves are in normal position, a rope eye 8 in which a choker line 9 or other rope is adapted to be retained. The upper surface of the transverse base 5 is plane to provide a seat 10 for the thimble 11 which is usually fitted to the free end of a line.

Extending forwardly from the base of the rear half 2 are hooks 12, each comprising a stem 13 and a retainer 14. The front half 1 is cut away at its lower corners as at 15 to conform to the shape of the inner side of the hook stem 13 and a portion of the transverse base 5 of said front half is cut away as at 16 to conform to the inner face of the adjacent retainer 14. The hooks 12 serve as stops to prevent the front half 1 from sliding downwardly upon the rear half 2 beyond the normal position as shown in Figures 1, 2 and 3. The hook stems 13 and the inner side of each of the retainers form seats for the lower corners 15 and 16 respectively of the front portion 1.

In the modification shown in Figures 4 and 5, the socket is made up in complementary portions, consisting of a front half 20 and a rear half 21, each of which form a loop having a transverse base 23 recessed on its inner face as at 24 to form a rope socket 25 when assembled. The rear half 21 is provided on opposite sides with forwardly projecting L-shaped members 26 which act in a substantially similar manner to the hooks 12 of the invention as shown in Figures 1, 2 and 3. The members 26 consist of a leg 27, one of which is shown in section in Figure 4, and a retainer 28 which is adapted to lap over onto the front face of the front half 20 at its base. The lower side edges of the front half 20 are cut away to provide slightly tapered slides 29 which are engaged between the retainers 28 and the front face of the rear half 21 and stops 30 which engage the upper edge of the legs 27. The length of the slides 29 is such as to allow the transverse base 23 of the front half 20 to be raised clear of the transverse base of the rear half 21 while retaining the two halves 20 and 21 in face contact with each other. The front half 20 is preferably provided on its front face with strengthening webs 31.

To connect the end of a line to the socket as shown in Figures 1, 2 and 3, the front half 1 is moved vertically until its transverse base 5 is moved well beyond that of the rear half 2. The thimbled end of a line is passed between the separated bases and the line is laid into the recesses 7, which recesses form, when the half 1 is restored to normal position, the rope eye 8. When the two halves are assembled, a clevis is attached by passing the clevis pin through the eye 6, thus locking the parts against relative endwise movement and locking the line in position.

The use of the modification shown in Figures 4 and 5 is similar to that previously described, except that in general use the loops would be connected by a link or other suitable device to a tag plate.

It will be obvious that the strain on the hoisting rope which passes through the loops will be equally divided between them and that in consequence there will be no tendency to slide one half upon the other or separate them in any way.

For the purpose of differentiation between the modifications of the invention, the words hooks and L-shaped members have been used and it is intended that the use of either of these terms in the claims shall mean either of the said elements.

What I claim as my invention is:

1. A rope socket comprising two complementary halves each being formed with a loop portion and a transverse bar portion, each of said halves having one plane surface extending around the loop portion and partly across the transverse bar, which plane surfaces are adapted to lie in contact with each other when the socket is assembled, each of said transverse bar portions being recessed to cooperatively receive the thimbled end of a rope, and means for holding the component parts in assembled position.

2. A rope socket comprising two complementary halves each being formed with a loop portion and a transverse bar portion, each of said halves having one plane surface extending around the loop portion and partly across the transverse bar, which plane surfaces are adapted to lie in contact with each other when the socket is assembled, each of said transverse bar portions being recessed to cooperatively receive the thimbled end of a rope, and means for holding the component parts in assembled position, said holding means consisting of a pair of hooks extending from the plane surface of one of the halves, said hooks being formed with an outstanding stem having a retainer at its outer end.

3. A rope socket comprising two complementary halves each being formed with a loop portion and a transverse bar portion, each of said halves having one plane surface extending around the loop portion and partly across the transverse bar, which plane surfaces are adapted to lie in contact with each other when the socket is assembled, each of said transverse bar portions being recessed to cooperatively receive the thimbled end of a rope, and means for holding the component parts in assembled position, said holding means consisting of a pair of hooks extending from the plane surface of one of the halves, said hooks being formed with an outstanding stem having a retainer at its outer end, said hook members being disposed at the lower outer extremities of the half socket from which they extend and said second half socket having cut away portions at its lower outer extremities adapted to seat upon the stems of the hooks.

4. A rope socket comprising two complementary halves each being formed with a loop portion and a transverse bar portion, each of said halves having one plane surface extending around the loop portion and partly across the transverse bar, which plane surfaces are adapted to lie in contact with each other when the socket is assembled, each of said transverse bar portions being recessed to cooperatively receive the thimbled end of a rope, and means for holding the component parts in assembled position, said loop portions each being provided with an eye, which eyes are adapted to be in register with each other when the halves of the socket are in assembled position.

GODFREY HENRY TREVOR.